G. O. BJORNEBY.
SHOCK ABSORBER.
APPLICATION FILED MAR. 27, 1917.
1,280,377.
Patented Oct. 1, 1918.
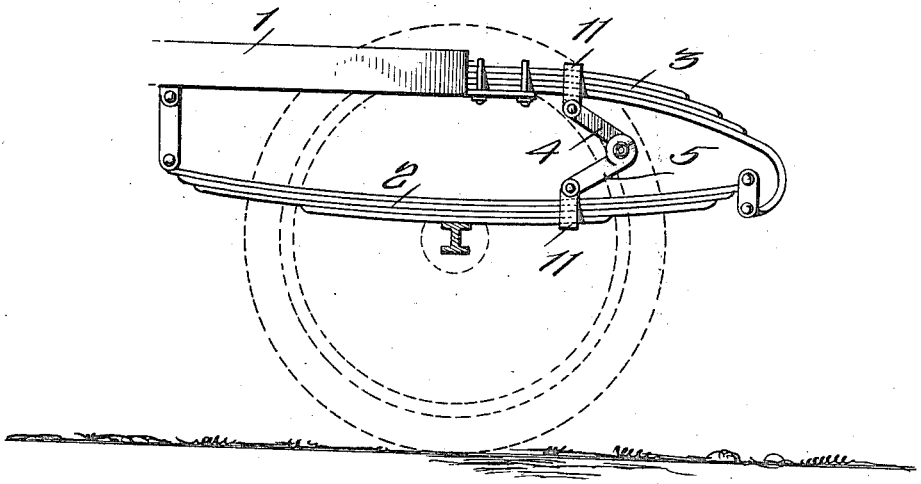
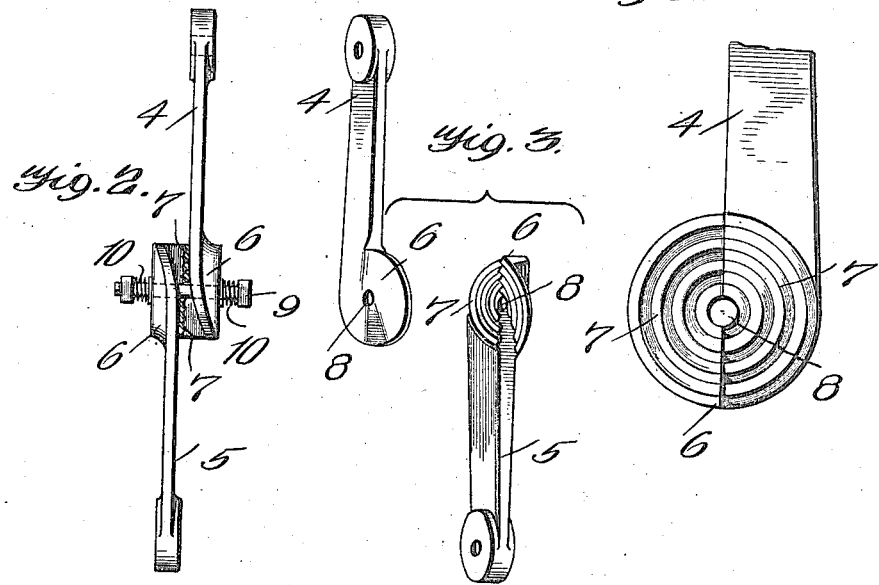
WITNESSES
INVENTOR
GEORGE O. BJORNEBY,
BY
ATTORNEYS

UNITED STATES PATENT OFFICE.

GEORGE O. BJORNEBY, OF KALISPELL, MONTANA.

SHOCK-ABSORBER.

1,280,377.  Specification of Letters Patent.  Patented Oct. 1, 1918.

Application filed March 27, 1917. Serial No. 157,747.

*To all whom it may concern:*

Be it known that I, GEORGE O. BJORNEBY, a citizen of the United States, and a resident of Kalispell, in the county of Flathead and State of Montana, have invented an Improvement in Shock-Absorbers, of which the following is a specification.

My invention is an improvement in shock absorbers, and has for its object to provide a device of the character specified, adapted for use with motor vehicles, for absorbing the recoil of the springs, to prevent such shocks and jars being transmitted to the body of the vehicle.

In the drawings:

Figure 1 is a side view of the spring of a motor vehicle with the absorber in place.

Fig. 2 is an edge view of the absorber with the parts in alinement and the springs under tension.

Fig. 3 is a perspective view with the parts separated.

Fig. 4 is a view from the inner side of one of the arms.

The present embodiment of the invention is shown in connection with the rear spring of a motor vehicle indicated at 1, the device being arranged between the lower spring 2 and the upper spring 3.

The improvement comprises a pair of arms 4 and 5, each of which is provided at one end with a substantially circular head 6. These heads have cam surfaces 7 on their inner faces, and each head has a central opening 8. A bolt 9 is passed through the registering openings of the heads, and coil springs 10 are arranged on the bolt between the respective heads and the head of the bolt and nut, the springs acting normally to force the heads together.

When the heads are turned on the bolt in opposite directions, the respective cam surfaces coöperate with each other to force the heads apart, and to put the springs under tension. The cam surfaces are so arranged that when the arms are together the highest portion of each cam surface will be in the lowest portion of the adjacent surface. When the arms move apart from each other the heads are forced apart by the action of the cam surfaces, placing the springs under tension.

The arms 4 and 5 are connected with the respective springs 3 and 2 by clips 11 which engage about the springs, and are connected to the ends of the arms, as shown. It will be noticed from an inspection of Figs. 2, 3 and 4 that the cam surfaces are grooved concentric with the opening 8, the grooves of one head receiving the ribs formed between the grooves of the other head.

In use, when the springs move toward each other the arms 4 and 5 move freely toward each other, while when the arms move apart the springs are placed under tension and the moving apart of the springs is hindered or cushioned. With the improved absorber, there is no hindrance to the movement of the springs toward each other but an increasing hindrance to their moving apart.

I claim:

A device of the character specified, comprising a pair of arms, each having at one end a head, each head having a central opening and one face of each head having oppositely arranged cam surfaces, each surface extending over approximately one-half the area of the head, and the surfaces being grooved concentrically with the central opening and forming ribs between the grooves, spring means for pressing the heads of the arms together, with the grooves of one head engaging the ribs of the other head.

GEORGE O. BJORNEBY.

Witnesses:
CHARLES H. FOOT,
MARIE CANNON.

Copies of this patent may be obtained for five cents each, by addressing the "Commissioner of Patents, Washington, D. C."